United States Patent [19]
Yokomae (nee Takano) et al.

[11] Patent Number: 6,122,398
[45] Date of Patent: *Sep. 19, 2000

[54] METHOD OF RECOGNIZING A SCREW HOLE AND SCREWING METHOD BASED ON THE RECOGNITION

[75] Inventors: Misuzu Yokomae (nee Takano), Katano; Yoshihiro Itsuzaki, Kashihara; Kinji Horikami, deceased, late of Suita, by Mitsuko Horikami, heir; Kazumasa Okumura, Soraku-gun, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/632,725

[22] Filed: Apr. 10, 1996

[30] Foreign Application Priority Data

Apr. 11, 1995 [JP] Japan ................................. 7-085584

[51] Int. Cl.[7] .............................. G06K 9/00; G06T 7/60; G01B 11/08
[52] U.S. Cl. ......................... 382/152; 382/151; 382/199; 382/282; 382/291; 29/407.04; 29/407.09; 364/468.21; 364/474.35; 364/167.05
[58] Field of Search ...................... 382/141, 152, 382/153, 145, 151, 147, 100, 194, 204, 199, 282, 286, 289, 291; 348/86, 87, 94, 95; 250/559.29, 559.3, 559.33, 559.37, 559.42; 901/47, 46; 73/865.8; 29/407.01, 407.04, 407.09, 407.1, 407.05, 720, 721, 525.01, 525.11; 81/57.4

[56] References Cited

U.S. PATENT DOCUMENTS

| | | | |
|---|---|---|---|
| 4,562,756 | 1/1986 | Otsuki et al. | 81/57.4 |
| 4,643,579 | 2/1987 | Toriumi et al. | 356/401 |
| 4,647,208 | 3/1987 | Beiman | 356/375 |
| 5,125,035 | 6/1992 | McCarthy et al. | 382/141 |
| 5,446,801 | 8/1995 | Itsuzaki et al. | 382/141 |
| 5,579,415 | 11/1996 | Takano et al. | 382/282 |
| 5,742,701 | 4/1998 | Takano et al. | 382/141 |
| 5,771,309 | 6/1998 | Yamaoka et al. | 382/152 |

FOREIGN PATENT DOCUMENTS

| | | |
|---|---|---|
| 4-53636 | 2/1992 | Japan . |
| 5-8614 | 2/1993 | Japan . |
| 5-237729 | 9/1993 | Japan . |
| 7-225116 | 8/1995 | Japan . |
| 7-225117 | 8/1995 | Japan . |

OTHER PUBLICATIONS

European Search Report for Int'l Appln. No. 96909348.3 dated Aug. 24, 1998.
Japanese–language Search Report for Int'l Appln. No. PCT/JP96/01004.
D. W. Capson et al, "Automatic Visual Measurement of Surface–Mount Device Placement", IEEE Transactions on Robotics and Automation, vol. 6, No. 1, Feb. 1, 1990, pp. 44–52.
L. Brem et al, "A Machine Vision System For Positioning An Industrial Robot" Proceedings of the IEEE/RSJ International Conference on Intelligent Robots and Systems, Raleigh, N.C. Jul. 7–10, 1992, vol. 3, pp. 1839–1846.
D.D. Grossman et al, "Concentric Part Inspection Device", IBM Technical Disclosure Bulletin, vol. 25, No. 12, May, 1983, New York, pp. 6402–6403, XP002071525.

*Primary Examiner*—Leo H. Boudreau
*Assistant Examiner*—Brian P. Werner
*Attorney, Agent, or Firm*—Ratner & Prestia

[57] ABSTRACT

Deviation between an upper portion and a lower portion of a screw hole is recognized. This is accomplished by imaging holes in respective objects to obtain a contrast image. The position of the hole in the upper object and the lower object is detected. The deviation between the positions is calculated. Screws are tightened sequentially beginning with the hole having the smallest deviation. The rotation angle of the object to be tightened is determined. From this rotation angle, the deviation of other holes is calculated.

6 Claims, 3 Drawing Sheets

Contour scanning window A

12a~12h ... Concentration correlation lines

METHOD OF RECOGNIZING A SCREW HOLE AND SCREWING METHOD BASED ON THE RECOGNITION

FIELD OF THE INVENTION

The present invention relates to a method of recognizing position by a visual recognition device in a screwing robot, and a screwing method on the basis thereof, and more particularly to a method of screwing by detecting each position from a contrast image of plural holes taken by image pickup means.

BACKGROUND OF THE INVENTION

The position recognizing method for detecting the position of an object from a contrast image imaged by an image pickup device is widely used in visual recognition device of robots in various production facilities.

Of the position recognizing method used in such facilities one example of, a prior art device for recognizing the position of a screw hole is described below.

FIG. 5 is a block diagram showing a construction of a position recognizing apparatus utilizing a conventional position recognizing method, in which the central position of a circular object, being a screw hole, is detected. In FIG. 5, reference numeral 20 is image pickup means for picking up an object (not shown) and issuing a video signal, 21 is contrast image memory means for storing the video signal obtained from imaging with the image pickup means 20 as contrast image data, 22 is contrast image scanning means for scanning the contrast image data by a contour scanning window A described later, thereby obtaining scanning data. Reference numeral 23 is position calculating means for calculating the position of the object by using the scanning data.

FIG. 6 shows a construction of the contour scanning window A used in FIG. 5, and in FIG. 6 reference numeral 24 is a contour scanning circle having a diameter equal to the contour of the circular hole in the object, and 25 is a concentration correlation line for measuring the image concentration inside and outside of the contour scanning circle 24, orthogonal to the contour scanning circle 24, and the contour scanning window A is a window comprising a plurality of concentration correlation lines 25.

The position recognizing operation in the position recognizing apparatus in FIG. 5 is explained below as an application in the contour scanning window A in FIG. 6.

The video signal (image data) issued from the image pickup means 20 is stored in the contrast image memory means 21. This is the image data of the circular object, and it is scanned by the contrast image scanning means 22 in the contour scanning window A shown in FIG. 6, and position is calculated by the position calculating means 23 in every concentration correlation line 25, and the position of the contour scanning window A where the number of concentration correlation lines 25 of which value is greater than the threshold is maximum is detected as the position of the circular object.

In this case, the position calculating means 23 calculates the absolute value of the difference between the measured concentration value of a point inside the contour of the object on the concentration correlation line 25, and the measured concentration value of a point outside the contour of the object.

In the conventional method of recognizing the position, however, there are problems. When tightening plural screws from the contrast image data imaged from the top of the workpiece shown in FIG. 2, if the deviation between upper and lower holes was large, then the screw tightening operation was stopped. Each screw hole would then need to be evaluated so that the screws could be tightened. Hence, much processing time was spent performing position recognition.

The invention is intended to solve the problems of the prior art, and it is hence an object thereof to present a method of recognizing a screw hole and screwing method based on the recognition for detecting the deviation of an upper hole in an object and a lower hole in an object of pairs of holes, tightening the screws sequentially from the one of smaller deviation, and tightening all screws. Or detecting the deviation angle of the object to be tightened after detecting positions of two points, calculating the deviation of other holes, and tightening at high speed.

SUMMARY OF THE INVENTION

To achieve the object, the invention is characterized by imaging plural screw holes in objects by image pickup means to obtain a contrast image, scanning the contrast image by the contrast image scanning means by a contrast scanning window comprising a contour scanning circle equal to the circular contour of a hole in an upper object on the contrast image and plural concentration correlation lines orthogonal to the contour scanning circle for measuring the image concentration inside and outside of the contour scanning circle. The absolute value of the difference between the measured concentration value of the inside concentration correlation line composed of a specific number of inside image concentration measuring points, and the measured concentration value of the outside concentration correlation line composed of a specific number of outside image concentration measuring points at every concentration correlation line, by position calculating means, detecting the position of the contour scanning window where the number of concentration correlation lines of which absolute value is greater than the specified concentration threshold value is maximum, as the position of the hole in the upper object. Next, the scanning range is set for the hole in the lower object and the contour scanning is equal to the contour of the hole in the lower object from that position. The deviation amount between the central position of the hole in the lower object is detected in the same method as the above method, and the upper hole central position, by the deviation calculating means, determining the deviation amounts in all plural pairs of holes, tightening the screws from the one of the minimum deviation, and minimizing the deviation of the other upper and lower holes.

Alternatively, when there are plural screw holes in objects, two points are imaged by image pickup means to obtain a contrast image, the rotation angle to the main body of the object to be tightened is calculated from the position detected in the above method by rotation angle calculating means, and positions of other holes and deviation are simultaneously calculated by hole position correction calculating means.

According to the invention, relating to the image data of the objects obtained by the image pickup means, the image is scanned by the contour scanning window comprising a plurality of concentration correlation lines orthogonal to the circular contour of the objects, and the position of the scanning window where the number of concentration correlation lines of which the absolute value of the difference between, the measured concentration value of the inside measuring point from the circular contour and the measured concentration value of the outside measuring point from the circular contour is larger than the threshold is maximum is detected as the position of the hole in object, and thereby the deviation amount of upper and lower holes is detected, and the screws are tightened sequentially from the one with the smallest deviation between upper and lower holes. Or, after detecting the positions of two points out of upper and lower holes in the above method, the rotation angles of the two points are calculated, the deviation of other pairs of holes is calculated, thereby tightening on the basis of the results thereof, so that plural screws may be tightened at high speed.

DESCRIPTION OF THE PREFERRED EMBODIMENT

Figure 1:
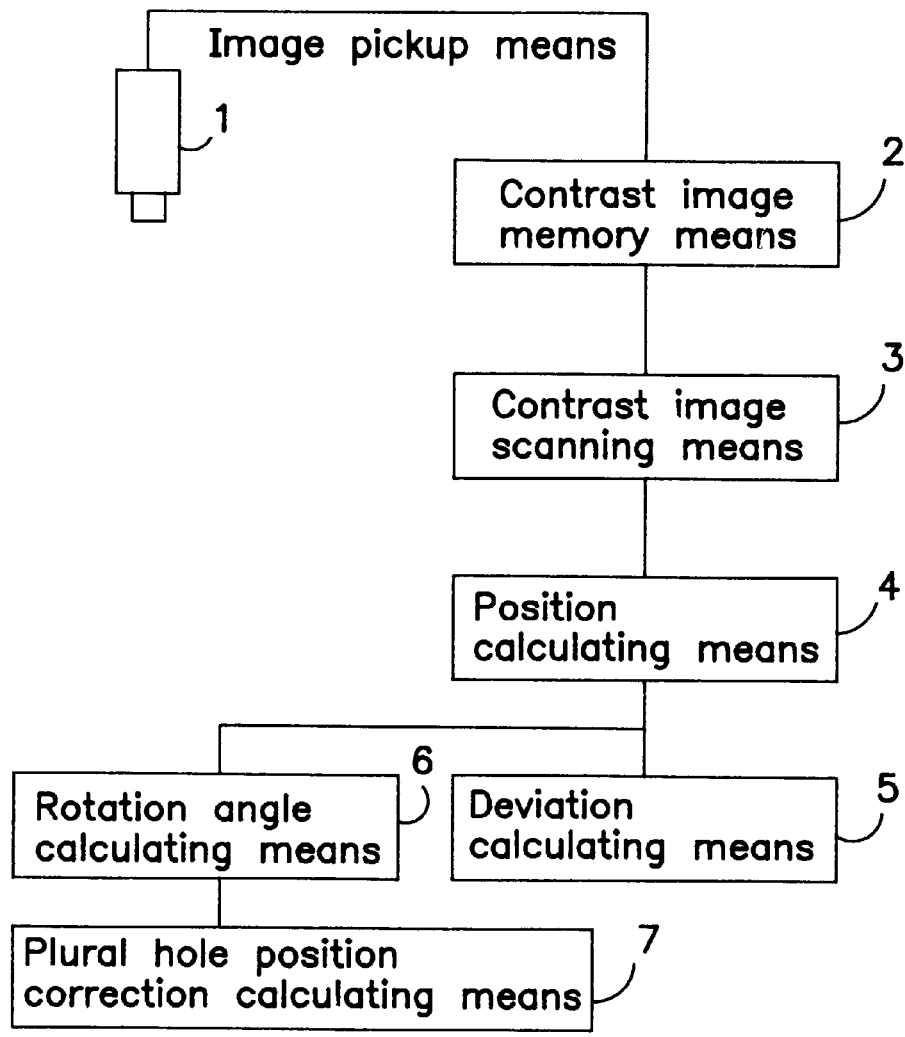
FIG. 1 is a block diagram showing a construction of essential parts of a position recognizing apparatus.

FIG. 1 is a block diagram showing construction of essential parts of a position recognizing apparatus.

In FIG. 1, image pickup means 1 takes an image of an object (not shown) to be tightened. The object has a plurality of screw holes and is overlaid on a main body, also having plural screw holes. The image pickup means issues a video signal, and the video signal is stored in contrast image memory means 2 as contrast image data. Contrast image scanning means 3 scans the contrast image data by the contour scanning window A (see FIG. 3) to obtain scanning data, and the position of the hole in one object imaged is calculated by using the scanning data by position calculating means 4. Once the positions of the holes in the upper object and lower object are obtained by the means 1 to 4, the deviation between the holes in the upper object and lower object is calculated in deviation calculating means 5. Alternatively, from the positions of two points obtained by the means 1 to 4, a rotation angle is calculated by rotation angle calculating means 6, and the deviation of other hole positions is calculated in hole position correction calculating means 7.

Figure 2:
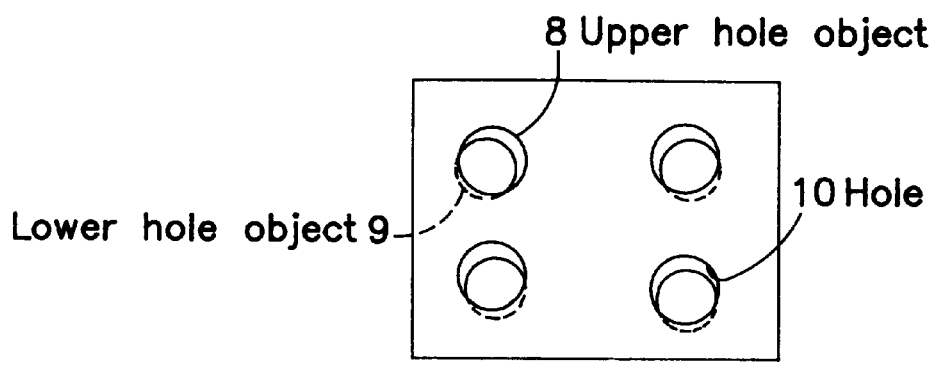
FIG. 2 is a top view showing an example of workpiece as the source of contrast image data used in the method of screwing in plural holes in the embodiment of the invention.

FIG. 2 shows an example of the top of the workpiece as the source of the contrast image data in FIG. 1, in which reference numeral 8 is an hole in an upper object and 9 is a lower hole hole in a lower object. When using above mentioned two points method, by making the upper hole object 8 as one point and diagonally existing upper hole 10 as the other point, the detecting precision usually becomes higher.

Figure 3:
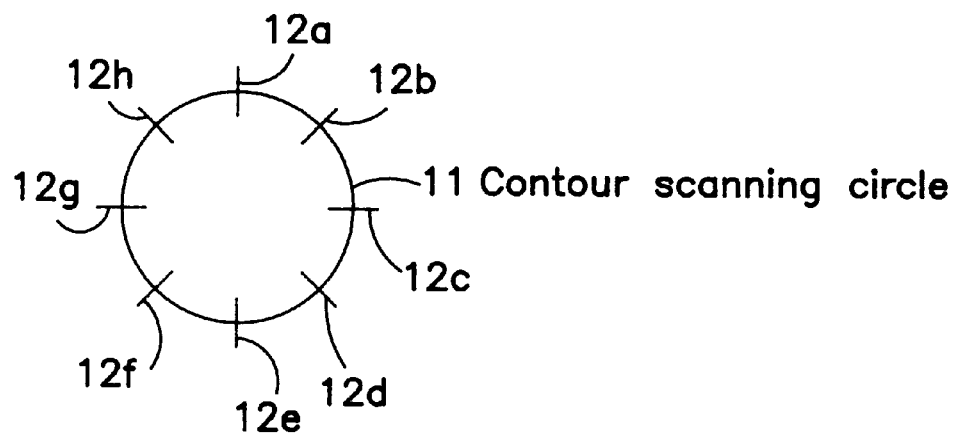
FIG. 3 is a diagram showing a construction of contour scanning window A used in the embodiment of the invention.

FIG. 3 shows a configuration of contour scanning window A used in this embodiment (FIG. 1), in which reference numeral 11 denotes a contour scanning circle having a diameter equal to the diameter of the circle of the image of the hole in the upper object 8, and 12a to 12h are a plurality of concentration correlation lines orthogonal to the contour scanning circle 11, for measuring the image concentration inside and outside of the contour scanning circle 11.

Figure 4:
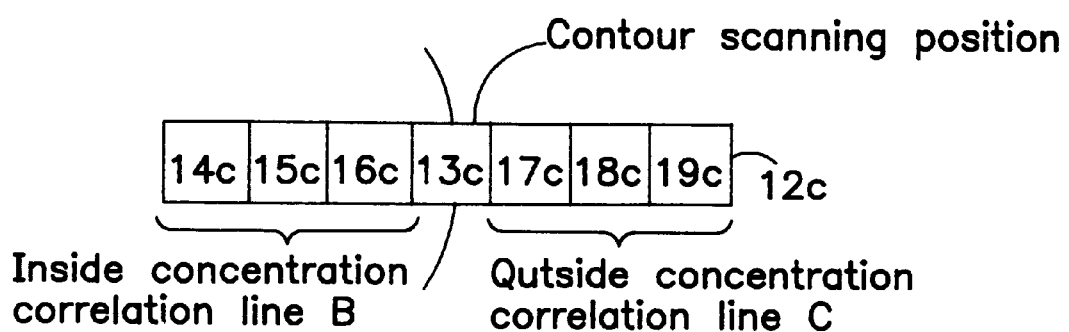
FIG. 4 is a detailed drawing of concentration correlation line in a part of the contour scanning window in FIG. 3.
Figure 5:
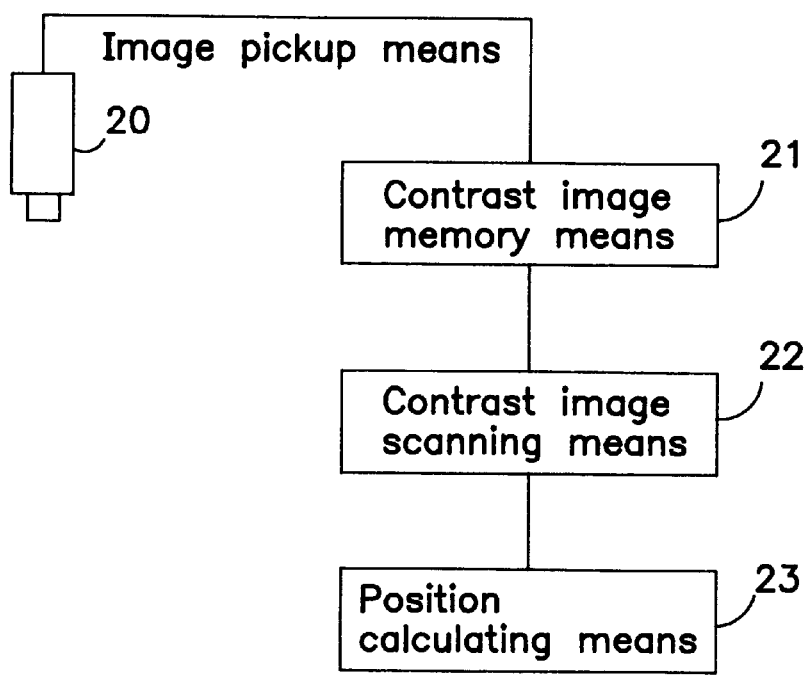
FIG. 5 is a block diagram showing construction of position recognizing apparatus using a method of recognizing position in a prior art.
Figure 6:
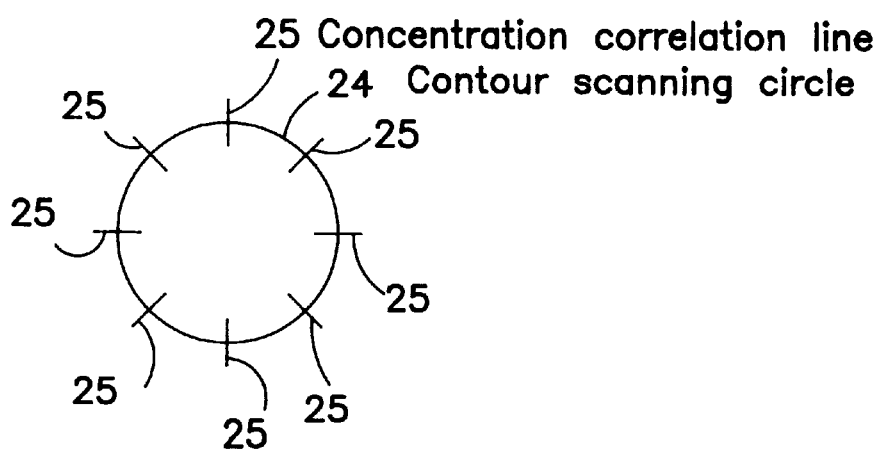
FIG. 6 is a diagram showing a construction of the contour scanning window used in the prior art in FIG. 5.

FIG. 4 shows the detail of 12c as a representative example of the concentration correlation lines 12a to 12h of the contour scanning window A used in the embodiment, in which reference numeral 13c represents the contour scanning position of the concentration correlation line 12c, 14c, 15c, 16c are a specific number of measuring points of inside image concentration composing the inside concentration correlation line B, and 17c, 18c, 19c are a specific number of measuring points of outside image concentration composing the outside concentration correlation line C.

The image recognizing operation in this embodiment is described below by reference to FIGS. 1–4.

First, the object not shown is imaged by the image pickup means 1 shown in FIG. 1 to obtain a contrast image, and it is stored in the contrast image memory means 2. The contrast image shows the hole in the upper object 8 as indicated by the solid line and the hole in lower object 9 as indicated by the dotted line in FIG. 2. In this case, the operation of the embodiment for detecting the upper and lower hole positions is described below.

The contrast image scanning means 3 shown in FIG. 1 begins to scan the contrast image stored in the contrast image memory means 2 in the right direction from an upper left position, by using the contour scanning window A shown in FIG. 3, and the position calculating means 4 calculates at each correlation lines 12a, 12b. 12h.

That is, at every concentration correlation B, C, the absolute value of the difference of the measured concentration values $14c+15c+16c$ of the inside concentration correlation line B comprising a specific number of measuring points of inside image concentration, and the measured concentration values $17c+18c+19c$ of the outside concentration correlation line C comprising a specific number of measuring points of outside image concentration, and the position of the contour scanning window A where the number of concentration correlation lines of which absolute value is greater than the specified concentration threshold is maximum is detected as the position of the upper hole and lower hole.

After detecting the positions of the upper and lower holes, each deviation is determined in the deviation calculating means 5, and the screws are tightened sequentially from the one of the smallest deviation.

For purposes of explanation, it is assumed that there is a first upper hole and a first lower hole (i.e., first hole pair), a second upper hole and a second lower hole (i.e., a second hole pair), and a further upper hole and a further lower hole (i.e., a further hole pair). A corresponding upper hole and lower hole (i.e., the first upper hole and the first lower hole) are referred to as a hole pair. The first upper hole, the second upper hole, and the further upper hole are in the upper substrate. The first lower hole, the second lower hole and the further lower hole are in the lower substrate. The mutual relation of all holes on any substrate (workpiece) is the same so each workpiece has several holes (for example 4 holes) at the same relative positions. Using image recognition as described above, the locations of the first upper and lower hole and the second upper and lower hole are physically (actually) located. Once the positions of the first upper and lower hole and the second upper and lower hole are physically located, the difference between the further upper hole and the further lower hole are determined. Thus, this determination of the difference between the further upper hole and the further lower hole is possible without physically (actually) locating the further upper and lower holes.

Once the location of the first upper hole and the first lower hole have been located, the difference between the first upper hole and the first lower hole is determinable (by simply subtraction). Once the location of the second upper hole and the second lower hole have been located, the difference between the second upper hole and the second lower hole is determinable (by simple subtraction). The difference between the further upper hole and the further lower hole are determinable as explained below. Once the difference between each upper hole and its corresponding lower hole is known, the hole pair with the smallest difference is identified in the deviation calculating means 5. The screws are tightened sequentially beginning with the hole pair of smallest deviation.

The following definitions may be helpful for understanding the present invention:

| | |
|---|---|
| 1$^{st}$ lower hole | $\alpha$ |
| 1$^{st}$ upper hole | $\alpha'$ |
| 2$^{nd}$ lower hole | $\beta$ |
| 2$^{nd}$ upper hole | $\beta'$ |
| further lower hole | $\gamma$ |
| further upper hole | $\gamma'$ |

Further more, for purposes of explanation, the following definitions are used:

| | |
|---|---|
| Position of first lower hole | (x1,y1) |
| Position of first upper hole | (x1',y1') |
| Position of second lower hole | (x2,y2) |
| Position of second upper hole | (x2',y2') |
| Position of further lower hole | (x3,y3) |
| Position of further upper hole | (x3',y3') |

A deviation amount is defined as a difference between an upper hole and a lower hole of a hole pair. A deviation amount is represented by the symbol for a particular hole followed by whether the deviation is being measured in the x direction (x) or the y direction (y). The deviation amounts for the first and second hole pairs are as follows:

$\alpha x = x1 - x1'$ $\alpha y = y1 - y1'$ $\beta x = x2 - x2'$ $\beta y = y2 - y2'$ Furthermore, the deviation amounts for the further hole pair is as follows:

$\gamma x = x3 - x3'$ $\gamma y = y3 - y3'$

In an exemplary embodiment of the present invention, it is assumed that a Cartesian plane is superimposed over the bottom substrate with x and y coordinate axes intersecting at (x1, y1). Thus, (x1,y1) is the origin of the coordinate axes which is situated at point (0,0). Since (x1,y1) has been translated (to the origin), (x2, y2) is also translated by the amount of translation which has been incurred to (x1,y1). This is expressed as follows.

Translated (x2, y2)=(x2−x1, y2−y1)

Translated (x2, y2) is defined as (x0, y0).

Using the translated Cartesian plane, a reference angle ($\theta 0$) drawn between the translated x coordinate axis and a ray intersecting (x0, y0) (in other words between $\alpha$ and $\beta$) is calculated as follows:

$$\theta 0 = \tan^{-1} \frac{y0}{x0}$$

Furthermore, using a further Cartesian plane relative to the top substrate, a reference angle ($\theta 1$) drawn between the translated x coordinate axis for the top substrate and $\beta'$ is defined as follows:

$$\theta 1 = \tan^{-1} \frac{y0 - \alpha x + \beta y}{x0 - \alpha x + \beta x}$$

The difference in rotation angle ($\theta$) between the lower substrate and the upper substrate is calculated as follows:

$\theta = \theta 1 - \theta 0$

Having completed the above mathematics, $\gamma x$ (which again, is x3−x3' or "the deviation amount") and $\gamma y$ (which again, is y3−y3') may then be calculated:

| | difference created by rotation | difference created by translation |
|---|---|---|
| $\gamma x =$ | $x3\cos\theta - y3\sin\theta$ | $+\alpha x$ |
| $\gamma y =$ | $x3\sin\theta + y0\cos\theta$ | $+\alpha y$ |

$\gamma x$ and $\gamma y$ may be calculated by the calculating means 7 as explained above.

The above description refers to a "further hole pair". The "further hole pair" can be any hole pair in the substrates. Thus, the deviation of several hole pairs can be calculated using the above procedure Once the deviation of multiple hole pairs within the substrates has been calculated, screws can be tightened sequentially in the substrates, beginning with the hole pair of least deviation.

Thus, using the obtained deviation amount values of the upper and lower hole positions, by tightening sequentially from the screw of the smallest deviation, plural screws can be tightened efficiently and at high speed.

As explained herein, according to the method of recognizing screw holes of the invention, by detecting the positions of upper and lower holes of the plural objects to be tightened, and tightening sequentially from the screw of the smallest deviation, the deviation can be corrected. Besides, after detecting two holes, by calculating the deviation of other holes from the rotation angle, the screws can be tightened efficiently and at high speed. The method of recognizing screw hole position of the invention may be also applied to recognition of position of one hole.

We claim:

1. A method of recognizing deviation between all upper screw hole in an upper object and a lower screw hole in a lower object, comprising the steps of:

(a) imaging first and second upper holes in the upper object and corresponding first and second lower holes in the lower object to obtain a contrast image;

(b) setting a contour scanning circle of a contrast scanning window substantially equal to the circumference of the first and second upper holes in the upper object;

(c) scanning the contrast image of a portion of the first and second upper holes in the upper object with the contrast scanning window onto plural concentration correlation lines, each concentration line having a portion of concentration measuring points inside the contour scanning circle and outside the contour scanning circle, each measuring point measures a value of image concentration at the respective measuring point, each concentration line is to measure image concentration inside and outside of the contour scanning circle;

(d) calculating the absolute value of the difference between a total measured concentration value of the image concentration inside the contour scanning circle of a correlation line and a total measured concentration value of the image concentration outside the contour scanning circle of a correlation line at every concentration correlation line;

(e) detecting the positions where the absolute values calculated in step (d) is greater than a specified concentration threshold value, as the position of the first and second upper holes in the upper object, (f) setting the scanning range of the contour scanning circle substantially equal to the circumference of the first and second lower holes in the lower object, (g) detecting the position of the first and second lower holes in the lower object;

(h) calculating the deviation amount between the position of the first upper hole and first lower hole and between the second upper hole and second lower hole;

(i) calculating the rotation angle of either the upper object or lower object to be tightened to the respective other of the upper object or lower object:

(j) calculating the deviation between the upper screw hole and the lower screw hole based on the calculated deviation amounts and rotation angle; and (k) inserting and tightening screws sequentially beginning with one of said holes in the upper object having a minimum deviation amount relative to a corresponding one of said holes in the lower object.

2. A method of recognizing deviation between a hole in an upper object and a hole in a lower object which when aligned form a screw hole according to claim 1, wherein futher screw holes are also recognized, further comprising the steps of:

tightening screws sequentially beginning with the screw of the minimum deviation.

3. A method of recognizing deviation between an existing upper screw hole in an upper object and an existing lower screw hole in a lower object comprising the steps of:

(a) obtaining the position of first and second upper holes in the upper object;

(b) obtaining the position of first and second lower holes in the lower object; and (c) calculating the deviation amount between the positions of the first upper and lower holes and between the positions of the second upper and lower holes;

(d) calculating a rotation angle of one of the upper object or lower object to be tightened relative to the other of the upper object or lower object;

(e) calculating the deviation amount in the existing upper screw hole and the existing lower screw hole based on the calculated deviation amounts and rotation angle; and (f) inserting and tightening screws sequentially beginning with one of said upper and lower holes of the minimum deviation amount.

4. A method of recognizing deviation between a hole in an upper object and a hole in a lower object which when aligned form at least one screw hole of claim 3, in which steps (a) and (b) include calculating the absolute value of the difference between a total measured concentration value of image concentration inside the contour scanning circle of a concentration correlation line and a total measured concentration value of the image concentration outside the contour scanning circle of the concentration correlation line.

5. A method of inserting a plurality of screws into a plurality of screw hole pairs which include corresponding first upper and lower holes, corresponding second upper and lower holes and corresponding further upper and lower holes contained in upper and lower objects, said method comprising the steps of:

a) detecting the position of said corresponding first upper and lower holes and the position of said corresponding second upper and lower holes;

b) determining deviation and rotation between said first upper and lower holes and said second upper and lower holes;

c) generating a deviation amount function based on deviation and rotation determined in step b);

d) applying said deviation amount function to a position of one of said further upper and lower holes to determine deviation between said further upper hole and said farther lower hole; and e) inserting said plurality of screws into said plurality of screw hole pairs beginning with which of said first upper and lower holes, said second upper and lower holes and said further upper and lower holes has the least deviation.

6. A method of inserting a plurality of screws into a plurality of screw hole pairs according to claim 5, wherein said correction deviation amount function is based on translation and rotation of one of said upper and lower objects relative to the other of said upper and lower objects.

* * * * *

UNITED STATES PATENT AND TRADE MARK OFFICE
CERTIFICATE OF CORRECTION

PATENT NO. : 6,122,398
DATED : September 19, 2000
INVENTOR(S) : Yokomae (nee Takano) et al.

It is certified that error appears in the above-identified patent and that said Letters Patent is hereby corrected as shown below:

Column 8, line 44, delete "farther" and insert --further--.

Column 8, line 52, delete "correction".

Signed and Sealed this

Twenty-second Day of May, 2001

*Attest:*

NICHOLAS P. GODICI

*Attesting Officer*     *Acting Director of the United States Patent and Trademark Office*